US012380717B2

(12) United States Patent
Hasegawa et al.

(10) Patent No.: US 12,380,717 B2
(45) Date of Patent: Aug. 5, 2025

(54) SELECTING FILES FOR INTENSIVE TEXT EXTRACTION

(71) Applicant: INTERNATIONAL BUSINESS MACHINES CORPORATION, Armonk, NY (US)

(72) Inventors: Tohru Hasegawa, Tokyo (JP); Takuya Goto, Kodaira (JP); Shunsuke Ishikawa, Shinjuku-ku (JP)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 17/694,003

(22) Filed: Mar. 14, 2022

(65) Prior Publication Data
US 2023/0290168 A1   Sep. 14, 2023

(51) Int. Cl.
G06V 30/19       (2022.01)
G06F 16/3331    (2025.01)
G06V 30/418     (2022.01)

(52) U.S. Cl.
CPC .... *G06V 30/19093* (2022.01); *G06F 16/3331* (2019.01); *G06V 30/418* (2022.01)

(58) Field of Classification Search
CPC ............ G06V 30/19093; G06V 30/418; G06F 16/3331; G06F 16/3349
See application file for complete search history.

(56) References Cited

U.S. PATENT DOCUMENTS

| | | | |
|---|---|---|---|
| 9,639,609 B2 | 5/2017 | Li et al. | |
| 2009/0226098 A1* | 9/2009 | Takahashi | G06F 40/194 382/218 |
| 2017/0109438 A1* | 4/2017 | Oliver | G06F 40/284 |
| 2017/0315965 A1 | 11/2017 | Pirvu et al. | |
| 2018/0336700 A1* | 11/2018 | Gao | G06T 7/337 |
| 2019/0279028 A1* | 9/2019 | Wang | G06N 3/08 |
| 2021/0133391 A1* | 5/2021 | Foncubierta Rodriguez | G06F 40/186 |
| 2022/0052976 A1* | 2/2022 | Peng | H04L 51/02 |
| 2022/0318315 A1* | 10/2022 | Wyle | G06V 30/414 |

FOREIGN PATENT DOCUMENTS

CN   113626385 A   11/2021

OTHER PUBLICATIONS

"Method and Process for Recipient Driven Dynamic content extraction," IP.Com, An IP.com Prior Art Database Technical Disclosure, Original Publication Date: Aug. 27, 2008, IP.com No. IPCOM000174125D, IP.com Electronic Publication Date: Aug. 27, 2008, 2 pages.

(Continued)

*Primary Examiner* — Akwasi M Sarpong
*Assistant Examiner* — Michael L Burleson
(74) *Attorney, Agent, or Firm* — Kelsey Skodje

(57) ABSTRACT

A feature of a subject file is identified. The feature is compared to a historical feature of a historical file. A similarity between the subject file and the historical file is calculated based on the comparing. A historical success metric for the historical file is identified. An intensive text extraction success value for the subject file is calculated based on the similarity and the historical success metric. Based on the intensive extraction success value, whether an intensive text extraction method should be performed on the subject file is determined.

20 Claims, 4 Drawing Sheets

(56) References Cited

OTHER PUBLICATIONS

"Method and System for Validating Information Extracted from Documents based on Selective User Feedback," IP.Com, An IP.com Prior Art Database Technical Disclosure, IP.com No. IPCOM000202426D, IP.com Electronic Publication Date: Dec. 15, 2010, 3 pages.

"Method and System to Generate Business Glossary from Enterprise PDF Documents," IP.Com, An IP.com Prior Art Database Technical Disclosure, IP.com No. IPCOM000265281D, IP.com Electronic Publication Date: Mar. 23, 2021, 5 pages.

* cited by examiner

SELECTING FILES FOR INTENSIVE TEXT EXTRACTION

BACKGROUND

The present invention relates to extracting text from files, and more specifically, to resource-intensive methods of extracting text.

Some organizations, such as governmental bodies and large companies, utilize file servers to store a large amount of files utilized by the organization. Some of these files may be created by the organization, while others may be created by third parties.

In some instances, locating a file in one of these file servers is performed by employing a searching program to analyze the files on the server. This sometimes includes extracting text from one or more files for identification purposes. In some instances, this text extraction can require few resources. Some types of text extraction, such as optical character recognition can be more resource intensive.

SUMMARY

Some embodiments of the present disclosure can be illustrated as a method of determining whether an intensive text extraction method should be performed on a subject file. The method comprises identifying a feature of the subject file. The method further comprises comparing the feature to a historical feature of a historical file. The method further comprises calculating, based on the comparing, a similarity between the subject file and the historical file. The method further comprises identifying a historical success metric for the historical file. The method further comprises calculating, based on the similarity and on the historical success metric, an intensive text extraction success value for the subject file. The method further comprises determining, based on the intensive extraction success value, whether an intensive text extraction method should be performed on the subject file.

Some embodiments of the present disclosure can also be illustrated as a system that contains a processor and a memory in communication with the processor. The memory contains program instructions that, when executed by the processor, are configured to cause the processor to perform the above method of determining whether an intensive text extraction method should be performed on a subject file.

Some embodiments of the present disclosure can also be illustrated as a computer program product that comprises a computer readable storage medium. The computer readable storage medium contains program instructions embodied therewith. The program instructions are executable by a computer system to cause the computer to perform the actions of the above method of determining whether an intensive text extraction method should be performed on a subject file.

DETAILED DESCRIPTION

Figure 1:
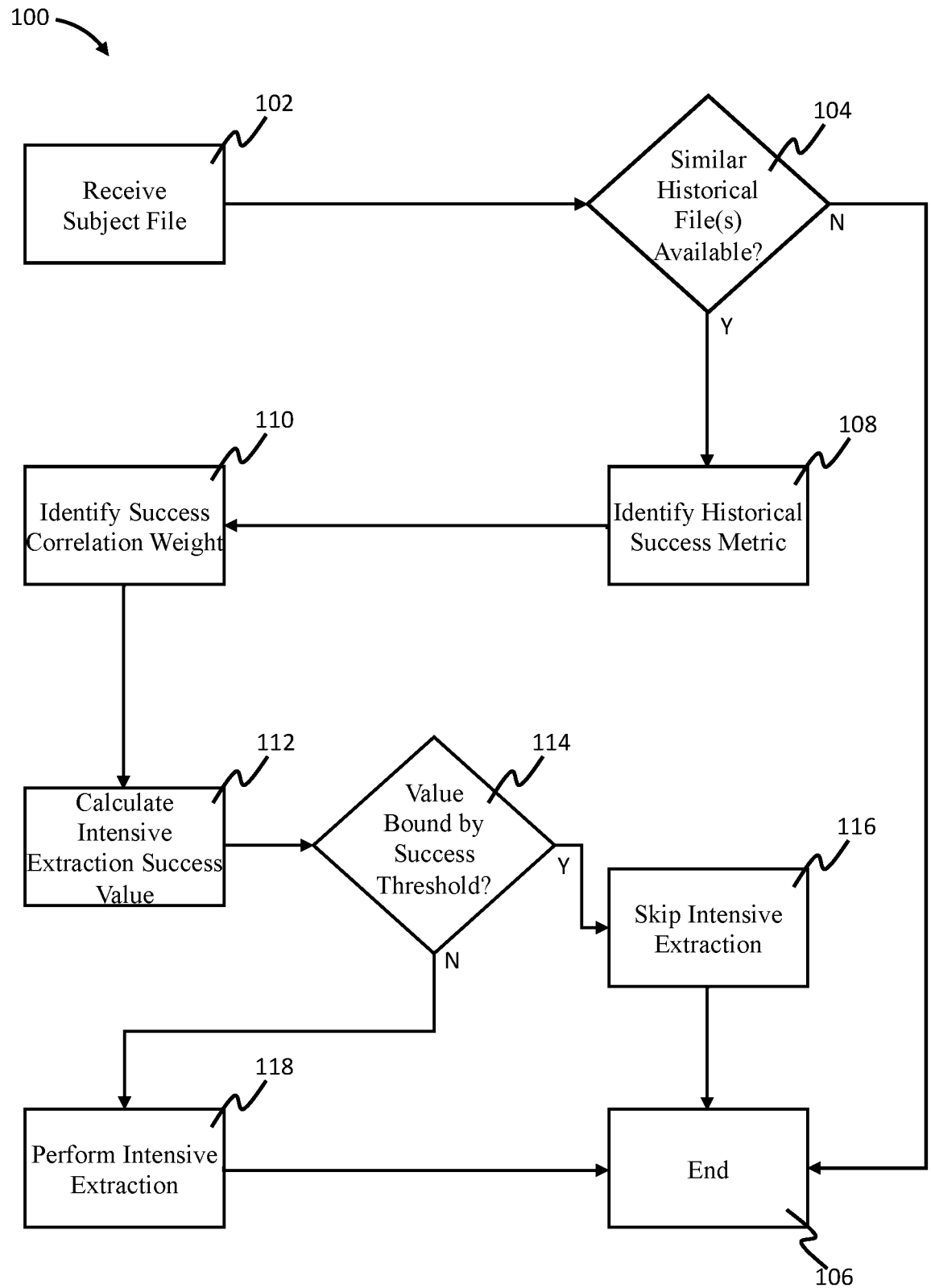
FIG. 1 illustrates a method of determining whether to perform resource-intensive extraction on a subject file, in accordance with embodiments of the present disclosure.

The amount of data stored by the typical organization is increasing. This has resulted in many organizations, such as governmental entities and large-and-medium-sized companies, to rely on storing files in large, enterprise-level file servers. These file servers may, for example, be owned by the company or provided by a third-party service. Some organizations may store a significant amount of files, for example, for regulatory reasons (e.g., record keeping). In some of these instances, the organizations may very rarely access those files.

Some organizations, on the other hand, store a large amount of files that those organizations access somewhat regularly. Historically, this practice was not problematic. However, as the amount of data and number of files stored by these organizations increases, locating a file (or set of files) that is (or are) needed for a business purpose may be difficult.

In some use cases, server-crawling software can be used to scan and analyze the files on a file server in a similar way that web-crawling software can be used to scan and analyze the files on the internet. This scanning typically includes extracting text from the files, and that text can then be analyzed to determine the properties of the file and the data therein. This analyzing may include, for example, natural-language processing of the text or matching the text with target search terms. The result of this analysis can then be provided to organizational personnel for their business purpose.

Several types of text extraction may be utilized when scanning the files on a file server. Basic extraction, for example, may be performed on plain text files in which text is formatted as a discrete object. These files are typically identified by recognizing supported file types, such as HTML, JSON, CSV, PDF, and others. Extracting text from a subject file using basic extraction methods typically takes relatively little time and relatively few processing resources. For some files, however, basic extraction is not sufficient.

Some files, for example, contain text that is not formatted as recognizable text, but as an image. For example, some files contain photographs of handwritten notes or text that is otherwise in a format that is not immediately extractable (e.g., certain PDF files). Text extraction in these files typically takes the form of performing optical character recognition on the image to identify letters or numbers. Any identified characters (e.g., letters or numbers) can then be analyzed using natural language processing to determine whether those letters or numbers are actually parts of a textual sample, are a false positive, or are, for example, an errant single character that may not be relevant.

Some other files, for example, may not contain any text, but may contain images that can themselves be described with text. An x-ray of a broken bone, for example, may contain no text itself, but the meaning behind the image (e.g., "broken tibia x-ray") may be expressed as text for later use. Extracting text from these files typically requires a machine-learning model that is trained to analyze an image, recognize particular features of that image, and assign text to describe those particular features.

In some use cases, text may actually be formatted in a way that it is quickly recognizable by a basic extraction method, but more thorough extraction may be necessary to derive any useful results from the text. For example, some files contain records of customer-support or human-resources conversations, which may need to be analyzed to ensure that proper messaging is being provided to customers or employees in response to questions. In this example, an extraction method capable of identifying pairs of questions and answers in a subject file (e.g., a machine learning model capable of performing natural language processing on a question and several possible answers) may be necessary.

In many use cases, these types of non-basic text-extraction methods may be significantly more time consuming and resource intensive than basic text-extraction methods. For example, processing a JPEG image through a machine-learning model that is trained to look for particular visual features may take significant processing power and time. For this reason, these non-basic text-extraction methods may often be referred to herein as "intensive" text extraction.

Intensive text extraction may be particularly useful in some use cases, and thus the benefits or relying on intensive text extraction may significantly outweigh the added time and resources required to perform it as compared to basic extraction methods. For example, if a company file server contains 90% image files and 10% basic text files, performing basic-text extraction without more may be unlikely to locate content that is necessary for a particular business purpose. However, if optical character recognition were performed on the image files on the image server, text therein may be identified and extracted. This may significantly increase the likelihood of locating needed content.

However, due to the increased time and resources necessary to perform intensive methods of text extraction, the benefits of intensive extraction may be outweighed in file servers (or for particular queries) in which text would not be extracted using those intensive methods. For example, processing a large portion of text files with a machine-learning model that has been trained to identify pairs of questions and answers may require a significant time and resource (e.g., processor dedication) investment, but may not result in any benefit if those text files do not contain any questions. Similarly, processing a large portion of image files with an OCR model that can identify characters may also require a significant time and resource investment, but may also not result in any benefit if those images do not contain any characters.

Unfortunately, intensive text extraction methods may be necessary in some use cases. For example, some organizations may store contracts that were executed with physical (i.e., pen and paper) signatures as scanned PDF or JPG files on a file server in order to include the physical signatures. Querying such a file server may require performing intensive OCR-based text extraction on those contract files.

However, while intensive text extraction methods are sometimes necessary for some files, performing intensive text extraction methods on all files in an organizations file server may require time and processing resources that are prohibitive for many organizations. Further, even when some intensive text extraction methods are sometimes necessary for some files, other text extraction methods may not prove to be beneficial for those same files. For these reasons, even when utilizing intensive text extraction methods may be particularly important for some organizations, utilizing several methods of text extraction on all the files that are scanned in those organizations' queries may prove to be impractical.

To address the issues identified above, some embodiments of the present disclosure predict, when scanning files in a file server, whether text extraction would be productive on a particular file. Some embodiments of the present disclosure may, for example, determine whether intensive methods of text extraction should be skipped on a subject file in an organization's file server. These embodiments may identify features of the subject file and compare those features to historical features of a corpus of historical files. These historical files may be, for example, other files in the organization's file server on which intensive text extraction has been performed previously. Some embodiments may involve identifying a set of one or more historical files whose features are similar to the subject file. Some embodiments may then analyze the historical success (or lack thereof) of intensive extraction methods on those similar historical files. This analysis may then be used to predict the likelihood that intensive extraction methods would be successful at extracting text from the subject file. If the likelihood of success for a particular intensive extraction method is not bound by a success threshold (e.g., is above the success threshold), intensive extraction methods may be performed on that file. If the likelihood of success for a particular intensive extraction method is bound by the success threshold (e.g., is below the success threshold), however, that particular intensive extraction method may be skipped for that file.

FIG. 1, for example, illustrates a method 100 of determining whether to perform resource-intensive extraction on a subject file, in accordance with embodiments of the present disclosure. Method 100 may be performed, for example, by a computer system (such as computer system 401) that is managing a query or indexing process of an organization's enterprise-level file server or file servers. In some embodiments, a computer system performing method 100 may include or utilize one or more machine learning models, such as machine-learning model 300, to perform one or more of the subprocesses within method 100. Thus, while method 100 will be described herein generically as being performed as "a computer system" (unless otherwise noted) for the sake of simplicity, it should be understood that various applications of method 100 may be performed in different ways, including by more than a single computer system.

As will be discussed below, method 100, as presented within FIG. 1, is intended to be illustrated as a simplified graphical presentation of the actual process that may be performed by an organization that is determining whether to perform resource-intensive extraction on a subject file. For this reason, the particular processes and subprocesses of method 100 may vary based on use case.

Method 100 begins in block 102, in which a computer system performing method 100 receives a subject file from which text is being extracted. This subject file may, for example, be a file that is owned by the organization that is directing the performance of method 100. For example, the subject file may be a customer-support chat in a corpus of customer-support chat logs, a file in a medical record, or a plain-text department memorandum. The organization may be extracting text from the subject file in order to process a query (e.g., a search for all company files about a particular product launch) or as part of an indexing process to prepare the file server for future queries. Thus, in some embodiments non-intensive text extraction (e.g., processing plain text) may be performed on the subject file independently of method 100.

Upon receiving the subject file in block 102, the computer system performing method 100 proceeds to determine, in block 104, whether any historical files that are similar to the subject file are available for analysis. A historical file, as used herein, may refer to a file on which one or more intensive methods of text extraction have already been performed, and for which the results of that intensive text extraction is recorded.

For example, a historical file may be another file that is stored in the same file server of the subject file that was received at block 102. However, the historical file may have had optical character recognition performed on it, which may have identified and extracted handwritten text in the historical file. The fact that optical character recognition was successful for the historical file may have been recorded in a database to which the computer system that is performing method 100 has access. The particular information that may be recorded is provided in more detail in the discussion of block 108.

In some embodiments, a historical file may not actually be a file owned by the same organization that owns the subject file. For example, in some embodiments a company that is performing method 100 as a service for the organization may provide a corpus of historical files for comparison. This corpus may be, for example, a database of files of various types that are intended to simulate the possible files that a client (e.g., the organization that owns the subject file received at block 102) may store in its file servers.

In some embodiments, a "historical file" may not actually be a stored file at all, but the features of a stored file that are recorded in a list of historical files. The features of the subject file could be compared against the features in those lists of features to identify a historical file (or a hypothetical historical file composed of those features) even if that historical file is not actually available in a stored format.

In some embodiments, determining whether a similar historical file is available in block 104 may include calculating a similarity value between the subject file and a historical file and comparing that similarity value to a threshold. If the similarity value is not bound by the threshold (e.g., if the similarity value is above the similarity threshold, which may occur, for example, if the similarity between the two files is higher than required by the threshold), the historical file and the subject file may be considered "similar" for the purposes of block 104. In some embodiments, features between the historical file and the subject file may be compared using n-gram analysis (e.g., comparing the frequency of the same letter or word in the title of each file) or by a machine-learning model that is trained to calculate similarity between two files. More information regarding calculating a similarity value is provided in the discussion of FIG. 2.

Features of a subject file and similar file that may be compared to determine similarity may vary based on the file types. For example, similarity may sometimes be found by comparing the origin of two files (e.g., whether they are stored on the same file server or the same directory/subdirectory on that file server), comparing the file names of two files, comparing the title that is embedded in the file (e.g., in metadata or at the beginning of a word-processing document), or other data.

In some embodiments, the features used to determine whether two files are similar may be specified by a user. For example, an employee of the organization that owns the subject file may be aware that many files with images of text (e.g., handwritten notes) are stored within the organization's file server, and that most of those files contain date stamps in the file name. In this example, the employee may specify that the similarity of the format/content of file names is an important feature to consider when determining whether two files are considered "similar" for the purposes of block 104.

In some embodiments, a computer system performing method 100 may determine whether a feature is important to consider when determining similarity. For example, a machine-learning model may analyze a set of historical files and determine that the creation-date of the file is highly correlated with whether that file contains text that can only be extracted by intensive methods. In this example, the computer system performing method 100 may compare the creation date of the subject file and historical files to determine similarity.

As noted, the features of the subject file that are compared to the historical file (or files) may vary based on the use case. More information regarding the types of features that could be compared when determining similarity is provided in the discussion of FIG. 2.

In some embodiments, block 104 may include determining whether a single historical file is considered "similar to" the subject file. However, in some embodiments block 104 may attempt to construct a class of files that are similar to the subject file. For example, a computer system performing method 100 could identify all available historical files that share a similarity value with the subject file above a similarity threshold. All those identified historical files may then be added to a "similarity class" for later extraction-success analysis. In some instances, a single similarity class may contain files that are similar to the subject file for different reasons (e.g., the multiple similar historical files may share different features with the subject file).

Selecting a single similar historical file, rather than, for example, a similarity class, may be beneficial in some use cases because later analysis steps may be significantly simplified if only a single historical file is being analyzed. These later steps, therefore, may take less time and less processing resources than if a class of similar files is utilized. However, the reliability of the calculations performed at later steps of method 100 may be improved if a larger number of similar historical files are utilized. In some use cases, the benefits of the improved reliability from using many historical files may outweigh the benefits of the simplified analyses of using fewer (or a single) historical files. However, in other use cases the benefits of the simplified analyses may outweigh the benefits of the improved reliability. For this reason, the number of historical files required in block 104 may depend on the use case in which method 100 is performed.

In some embodiments, whether a file is similar may be a binary decision. For example, if the subject file and a historical file each contain a date stamp in their file name, they may be considered "similar" (e.g., a "similarity value" for the two files may set to "1" or "true"). In other embodiments, whether a file is similar may be a threshold decision. For example, based on the compared features, a computer system performing method 100 may determine the similarity percentage of the subject file and the historical file. In this example, each feature of the subject file may be compared to the features of the historical file, and a similarity value could be calculated for that feature.

For example, if the title of the two files contain 80% of the same letters (for example, the two files may be meeting minutes for two different occasions), a "title" feature may be listed with a 0.8 similarity value. In this example, the average similarity values for all features of the subject file may be calculated, and this average may be used as the similarity value for the two files. In some other embodiments, only the highest feature similarity value may be used for the similarity value for the two files, or the average of the highest and lowest feature similarity values.

Thus, the process of determining, in block 104, whether a similar historical file (or a class of similar historical files) is available may vary based, for example, on the preferences of the organization that owns the subject file, the properties of the subject file, and the information available regarding the historical files. For the sake of understanding, a more detailed example of determining whether a similar historical file is available is provided in FIG. 2.

If a computer system performing method 100 determines, in block 104, that a similar historical file is not available, the computer system ends method 100 in block 106. In some embodiments, determining that a similar historical file is not available may cause the computer system to perform intensive extraction on the subject file. This may be preferred, for example, in use cases in which an organization does not want to skip intensive extraction on a subject file unless the confidence of intensive extraction failing predicted to be high. In other embodiments, determining that a similar historical file is not available may cause the computer to skip intensive extraction on the subject file. This may be preferred, for example, in use cases in which an organization wants to avoid the time and processing resources needed to perform intensive extraction except in cases in which that intensive extraction is predicted to be very likely at being successful.

If a computer system performing method 100 determines, in block 104, that one or more similar historical files are available, however, the computer system proceeds to block 108 in which a historical success metric is identified for the similar historical file. A historical success metric may, in some embodiments, be a measure of the extent to which intensive extraction was successful on the similar historical file. For example, if no text was extracted by an intensive extraction method that was not also extracted by simple extraction methods, that intensive extraction method may be rated as not successful in block 108.

In some embodiments, whether intensive extraction was successful for a similar historical file may be a binary consideration. For example, if an intensive extraction method was able to extract any text from a historical file, that intensive extraction method may be considered successful (e.g., the historical success metric may be set to "true" or "1.0") for the file. However, if that same intensive extraction method was unable to extract any text, the intensive extraction method may be considered unsuccessful (e.g., the historical success metric may be set to "false" or "0.0").

In some embodiments, whether intensive extraction was successful for a historical file may be a percentage calculation. For example, a historical success metric for a file may be determined based on the amount of text that is extracted, or the percentage of the file that appears to contain text that can be extracted by intensive extraction methods. These examples may be referred to as unweighted historical success metrics. In some embodiments, weighted historical success metrics may also be utilized. For example, a weighted historical success metric for a file may divide the amount of text that is extracted by an intensive extraction method (or the percentage of a file that is extracted text) by the amount of time required to perform that intensive extraction (e.g., a number of processor cycles) or the amount of resources required to perform that intensive extraction (e.g., a number of processor threads).

As noted, in some embodiments multiple similar historical files may be selected as a result of block 104. In these instances block 108 may involve identifying a separate historical success metric for each similar historical file that is identified in block 104. These separate metrics may be maintained separately, or combined as an aggregate (e.g., average) historical success metric for the class of similar historical files.

In some embodiments, identifying a historical success metric in block 108 may include querying a database for the historical success metric associated with a particular historical file. For example, an organization that owns the subject file received in block 102 may store historical success metrics for historical files in a database. When a similar historical file is selected as part of block 104, therefore, the historical success metric may be retrieved from that database in block 108. In other embodiments, the historical success metric may be calculated in real time based on historical data (e.g., the amount of text extracted and the amount of time required to extract the text).

As noted above, in some embodiments a historical file may not take the form of an actual file, but a set of features that a hypothetical historical file may contain. In these embodiments, calculating a historical success metric in block 108 may include calculating a success metric for that historical file based on information available for each of those features. For example, a database may store information that states a first feature is associated with a high historical success rate but a second feature is associated with an average historical success rate. In this example, block 108 may calculate a 70% historical success metric for the two features combined.

Once the historical success metric is calculated in block 108, the computer preforming method 100 proceeds to block 110 in which a success correlation weight is identified. A success correlation weight may be described as an expression of the extent to which the features that were found to be similar between the subject file and the historical file are correlated with the likelihood intensive text extraction is to be successful for a particular file.

For example, a subject file and the similar historical file may be determined to be similar in block 104 because their creation dates are very similar. However, the computer system may also determine that historical files that that share similar creation dates have vastly different intensive extraction results. As a result, the computer system may determine that the subject file and historical file sharing a similar creation date is not a reliable indicator of likelihood of intensive extraction success. In this example, the success correlation weight may be low.

In some embodiments, a success correlation metric may be identified by querying a database to which the computer performing method 100 has access. For example, a database may contain, for each feature in a set of historical files, the extent to which that feature is correlated with intensive extraction success. Features that tend to be shared among files with high historical success metrics may have high success correlation weights.

In some embodiments, a success correlation metric may be calculated over time by a machine-learning algorithm. For example, as a machine-learning algorithm performs iterations of method 100, it may learn the similarities between features that are shared by files for which intensive extraction is successful. This knowledge may then be used to identify the success correlation weight in block 110.

In some embodiments, a success correlation metric may also be calculated by a simpler computer system. For example, a computer system could collect a sample of historical files that are similar to the subject file. If all those historical files have a similar historical success metric, then the similar features are likely correlated with extraction success and the success correlation weight may be set high in block 110.

In some situations, a knowledgeable user (e.g., an employee of the organization that own the subject file) may be aware of the features that are highly correlated with extraction success. In these situations, this user could program the features that are correlated with success into the system, and that list of features could be used to calculate a success correlation weight in block 110.

A success correlation weight that is identified in block 110 may be utilized in different ways based on the particular embodiment of method 100. For example, in some embodiments the success correlation weight could be multiplied against the historical success metric that was identified in block 110. Thus, a low success correlation weight may reduce the effective historical success metric for a similar historical file.

In some embodiments, a historical success metric could also be used to weight a similarity value that was calculated in block 104. If this were performed before block 104 is completed, this could cause a historical file that would otherwise be identified as "similar" to be identified as "not similar" in block 104. In some cases, this would have the effect of removing from consideration features that are not correlated with extraction success when determining whether a subject file and historical file are similar. This practice may have benefits that may be weighed based on the preferences of the use case.

For example, significantly weighting a similarity value between two files with the extent to which the similar features between those files are correlated with extraction success may cause later predictions in method 100 to only consider features that are relevant to intensive extraction. This may be beneficial because it could help to avoid predicting whether intensive extraction is likely to be successful on a subject file based on features that are not actually relevant to that likelihood.

In some embodiments, a success correlation weight calculated at block 110 may be utilized when predicting the likelihood of success of intensive extraction for the subject file. This prediction is discussed with respect to block 112.

Of note, identifying a success correlation weight, as in block 110, may not be essential to predicting a success of intensive extraction for a subject file in some circumstances. For this reason, some embodiments of the present disclosure may feature methods of determining whether to perform intensive extraction that do not include a identifying a success correlation weight. These methods may, for example, otherwise resemble method 100, but block 108 may proceed directly to block 112.

Method 100 continues in block 112, in which a computer system calculates an intensive extraction success value for the subject file. The intensive extraction success value also referred to herein as a "success value") expresses a predicted likelihood that intensive extraction would succeed in extracting text from the subject file. This success value may be calculated in several ways.

For example, in some embodiments a simple method of calculating a success value may include multiplying a similarity value calculated at block 104 by the historical success metric calculated at block 108. In some embodiments, for example, both the similarity value and the historical success metric may be both be binary. Thus, if a computer system determines in block 104 that a subject file and historical file are similar, the similarity value may be set to 1.0. Similarly, if the computer system determines that intensive extraction did extract text from the historical file, the historical success metric may also be set to 1.0. In this example, the extraction success value may be 1.0 multiplied by 1.0, equaling 1.0. In other words, if both the similarity value and historical success metric are binary, the success value would predict extraction success only if both the similarity value and historical success metric are true.

If, on the other hand, either the similarity value and the historical success metric were binary but the other was not binary, the intensive extraction success value may instead equal the non-binary value or zero. For example, if the similarity value were determined to be 0.8 (e.g., 80% similar), the historical success metric may be 0.0 or 1.0. If the historical success metric were 0.0, the intensive extraction success value would be 0.0. But if the historical success metric were 1.0, the intensive extraction success value would be 0.8 (e.g., 80% likely to succeed). If both the similarity value and historical success metric were non-binary, the intensive extraction success value may still be a product of multiplying the similarity value and success metric.

In some examples of the above, the intensive extraction success value may also be weighted by the success correlation weight calculated in block 110. For example, in any of the above calculations, the product of the similarity value and the historical success metric could be multiplied by the success correlation weight to equal the intensive extraction success value.

In some embodiments, a machine-learning model may be utilized to calculate the intensive extraction success value in block 112. For example, in some embodiments the features of a subject file may be input into a machine-learning model that analyzes those features based on learned correlations between features of historical files and a high rate of intensive extraction success. Based on that analysis, the machine-learning model may output an intensive extraction success value in block 112. Further, because the machine-learning model may more significantly weight features that are correlated with extraction success, this output intensive extraction success value may effectively incorporate a success correlation weight from block 110. Further, in some such embodiments, the machine-learning model may base also digest the subject file to determine the features of that subject file in block 102. In other embodiments those features may have been determined by a separate computer system (e.g., a second machine-learning model), which may input the features into the machine-learning model in block 112.

Upon calculating an intensive extraction success value in block 112, the computer system performing method 100 may determine, in block 114, whether that success value is bound by a success threshold. Block 114 may effectively determine, therefore, whether the likelihood of successfully extracting text through intensive extraction (as calculated in block 112) is high enough to justify intensive text extraction.

Thus, the success threshold utilized in block 114 may depend upon the preferences of the use case in which method 100 is being performed. For example, if accuracy of indexing or query results is particularly important to an organization, that organization may prefer to risk performing intensive extraction methods on subject files that are less likely to have text that is extracted from those methods rather than to risk skipping intensive extraction on subject files that may have text that could be extracted from intensive extraction methods. In these examples, an organization may set the success threshold to be very unrestrictive (e.g., low), such that even moderate extraction success values would not be bound by it (e.g., would not be below it). However, if avoiding expending time and resources on intensive extraction methods that do not succeed in extracting text from subject files is particularly important to the organization, the organization may set the success threshold to be more restrictive.

If the computer system that is performing method 100 determines, in block 114, that the success value is bound by the success threshold (i.e., the success value is not high enough), the computer system proceed to determines to skip intensive extraction for that file in block 116 and ends method 100 in block 106. If, however, the computer system determines that the success value is not bound by the success threshold, the computer system determines to perform intensive extraction on the subject file in block 118. In some embodiments, block 118 may include actually performing the intensive extraction on the subject file. In other embodiments, block 118 may simply select the subject file for intensive extraction to be performed by another computer system.

As discussed previously, the intensive extraction method selected for in block 118 may vary based on the use case. For example, some embodiments of the present disclosure may select optical-character-recognition-based extraction, in which case images in the subject file may be analyzed (e.g., by a machine-learning model) to identify characters within those images. Those characters may then be extracted as text. In some such embodiments, natural language processing may also be performed on the recognized characters, and the meaning of the characters (e.g., words, sentences, sentiments) may be stored as a result of the extraction.

In some embodiments, intensive extraction methods may include searching for question-answer pairs in a subject file. For example, a computer system may analyze the text in a subject file to identify pairs of questions and answers. This method may also be performed, for example, on the results of optical-character-recognition methods. Any identified question-answer pairs can be labeled and stored together in a record file.

In some embodiments, intensive extraction may include analyzing an image to recognize features within the image, such as people, known objects, known locations, or others. These features may be labeled with text metadata and stored in a record file with the extraction results.

In some embodiments, the results of method 100 may apply to all available methods of intensive text extraction. For example, if an organization had the capability to perform both optical-character-recognition and question-answer-pair extraction methods, a determination that the success value is not bound by the success threshold in block 114 may result in the subject file always being selected for both optical-character-recognition and question-answer-pair extraction. However, in some embodiments more precise methods may be utilized.

For example, in some embodiments each intensive extraction method may have its own success threshold assigned, and thus a separate iteration of block 114 may be performed for each extraction method. For example, if the success threshold for optical-character-recognition extraction were set to 30% and the success threshold for question-answer-pair extraction were set to 40%, a success threshold of 35% may result in the subject file being selected for optical-character-recognition extraction but not question-answer-pair extraction in block 114.

Further, some embodiments of method 100 may maintain separate historical success metrics for each method of intensive extraction, and thus may perform 108 separately for each method of intensive extraction available. Similarly, because different file features may be correlated with different methods of intensive extraction, some embodiments of method 100 may include performing block 104 separately for each method of intensive extraction (for example, calculating a different similarity value for each method). As such, some embodiments of the present disclosure may perform blocks 104 through 118 separately for each intensive extraction method.

Finally, some embodiments of the present disclosure may record the results of intensive extraction of the subject file after (or as part of) block 118. These recorded results may be used to add the subject file as a historical file, record the historical success metric for the subject file, and contribute to calculating the correlation between file features and likelihood of success of intensive extraction for those files.

After the computer system performs block 118, method 100 ends in block 106.

Figure 2:
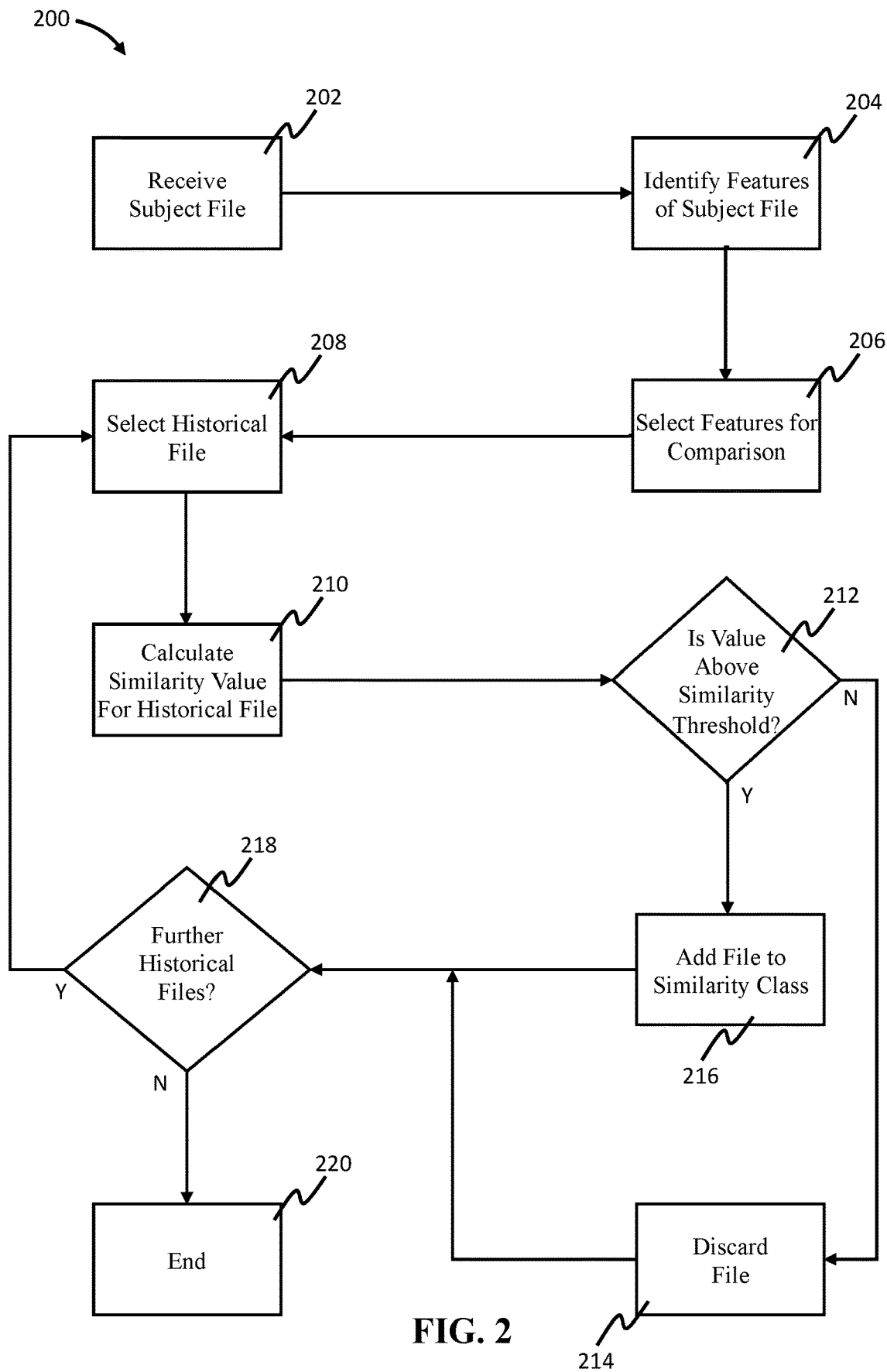
FIG. 2 illustrates a method of creating a class of files that are similar to a subject file, in accordance with embodiments of the present disclosure.

FIG. 2 illustrates a method 200 of creating a class of files that are similar to a subject file, in accordance with the present disclosure. Similar to method 100, method 200 may be performed, for example, by a computer system (such as computer system 401) that is managing a query or indexing process of an organization's enterprise-level file server or file servers. In some embodiments, a computer system performing method 200 may include or utilize one or more machine learning models, such as machine-learning model 300, to perform one or more of the subprocesses within method 200. Thus, while method 200 will be described herein generically as being performed as "a computer system" (unless otherwise noted) for the sake of simplicity, it should be understood that various applications of method 200 may be performed in different ways, including by more than a single computer system.

Method 200 begins in block 202 in which a subject file is received. This subject file may be a file that is owned by an organization for which method 200 is being performed and a file that is being considered for intensive text extraction. For example, in some embodiments method 200 may be performed as a subprocess of that consideration (e.g., as a subprocess of method 100).

Once the subject file is received, the features of the subject file are identified in block 204. Identifying the features of a subject file may include, for example, extracting metadata from the subject file. This metadata may include, for example, the file name, size of the file, data in HTML tags, dates related to the file (e.g., date created, date of last access, date of last modification), creator of the file, owner of the file, format of the file, number of pages, and others. Identifying the features of a subject file may also include extracting available text data from the file, such as a title, author information written on a title page and others. Some other example features may include the file server from which subject file was received, as well as the directory information on that file server. If available, data regarding the contents of the file such as the number of embedded images of the file may also be included as a feature.

In some embodiments, identifying features of the subject file in block 204 may also include performing analysis on available data and metadata from the file, such as performing natural-language processing on the file name or title or analyzing the format of the data and metadata (e.g., does the file have both hyphens and letters?). The results of this analysis can also be added to the features for the file.

Upon identifying features of the subject file, a computer performing method 200 selects, in block 206, some of those identified features for comparison with a historical file. This selection may vary based on the capabilities of the system and preferences of the organization that owns the subject file. In some embodiments, this selection may include, for example, selecting all features that were identified in block 204. This may be the most inclusive method, which may potentially increase accuracy of later analysis of the subject file, but may also increase the resources required to perform that analysis.

In some embodiments, therefore, block 206 may include eliminating some features identified in block 204. For example, block 206 may cross reference the list of features identified in block 204 against a list of features that are known to be found in a corpus of historical files and eliminate any features that are not found in both lists. This may eliminate features that are not likely to contribute to the similarity of the subject file and historical files in the corpus.

Similarly, block 206 may cross reference the list of features identified in block 204 with a list of features uploaded by a knowledgeable user. This uploaded list of features may, for example, be known to be highly correlated with the likelihood that intensive extraction methods will successfully extract text from a subject file. This may eliminate features that are not likely to contribute to the likelihood of success of intensive extraction methods on the subject file.

In some embodiments, block 206 may be performed by a machine-learning model that has been trained to recognize correlations between features of a file and the likelihood that intensive extraction methods actually extract text from that file. For example, a machine-learning model may recognize that a high amount of unrelated files in an organization's file server contain time stamps in the file name and that there is no apparent correlation between whether a file name contains a time stamp and whether intensive extraction on that file would be successful. Thus, a machine-learning model may not select the presence of time stamps in the file name as a feature.

In some embodiments, different features may be selected for each method of intensive extraction. For example, if a subject file were being considered for, question-answer pair extraction, image-analysis extraction, and optical-character-recognition extraction, a separate iteration of block 206 may be performed for each extraction method. Further, in some embodiments of method 200 these separate iterations may contain different analysis. For example, a first iteration of block 206 may select features for comparison for question-answer-pair extraction by comparing the identified features from block 204 with a first list of features uploaded by a user. A second iteration of block 206 may select features for comparison for image analysis extraction by inserting the features identified in block 204 into a machine-learning model. Finally, a third iteration of block 206 may select features for optical-character recognition by comparing the identified features from block 204 with a second list of features uploaded by a user.

Once the features for comparison are selected in block 206, the computer system performing method 200 selects a historical file for comparison in block 208. The historical file selected in block 208 may be provided, for example, by a service that indexes an organization's file servers. The historical file could also be selected from a list of the organization's owned files that have already had intensive extraction methods performed on them.

The selection in block 208 may, for example, select any historical file at random from a list of the organization's files that have already been through intensive extraction. However, a more precise selection may also be employed. For example, in some embodiments the organization's files may be grouped based upon similarity. In these embodiments, block 208 may select a historical file from a particular group (e.g., a group with which the subject file has not yet been compared). In some embodiments, block 208 may also select only historical files that have at least a threshold number of features in common with the features elected for comparison in block 206.

Upon selecting a historical file, the computer system performing method 200 may calculate, at block 210, a similarity value between the subject file and that selected historical file. In some embodiments, the computer system could perform this calculation through, for example N-gram analysis by determining and comparing a frequency of each word/letter in a character string in both the subject file and the selected historical file. For example, some iterative files may share very similar file names (e.g., " . . . $24^{th}$ anniversary" and " . . . $25^{th}$ anniversary"). Formats and patterns of different file titles, file names, or other data could also be compared (e.g., number of characters in the file name, lot number and date in a title, same number of letters followed by the same number of integers, etc.). Analysis could be performed on each file to determine that both file names have a date appended, and the proximity of those dates on the calendar could be calculated.

In some embodiments, block 210 may include calculating a separate similarity value for each feature shared by the subject file and historical file. For example, a first similarity value may be calculated for the file names of the files, and a second similarity value may be calculated for the number of pages of the files. These separate similarity values may then be combined somehow (e.g., averaged) to calculate the similarity value for the historical file.

Upon calculating the similarity value in block 210, the computer system determines, in block 212, whether the similarity value is above the similarity threshold. This determination may dictate whether the selected historical file is added to a similarity class for use in determining whether to perform intensive extraction on the subject file. As with other thresholds discussed herein, the particular value of the similarity threshold may be determined by the preferences of the organization that is performing or for whom method 200 is being performed.

For example, some organizations may prefer to ensure that all files with text that requires intensive extraction methods are processed with those intensive extraction methods. For these organizations, setting too high of a similarity threshold may risk eliminating many relevant files. This could cause files that have outlier intensive-extraction results to have a high impact on the predicted success of intensive extraction on the subject file, skewing the results of analysis. Thus, these organizations may set the similarity threshold relatively low.

However, setting the similarity threshold too low may significantly reduce the required similarity for a historical file and the subject file. This may cause historical files that are dissimilar to the subject file to be included in the analysis when predicting whether intensive extraction methods would succeed in extracting text from the subject file. In other words, this may cause the success (or lack thereof) of intensive extraction methods on files that are not similar to the subject file to impact the prediction of whether those intensive extraction methods would be successful on the subject file. For the above reasons, an organization may fine tune the similarity threshold over time to ensure that its preferences are being met by the subject-file analysis.

If, in block 212, the computer system determines that the similarity value is not above the similarity threshold, the selected historical file is discarded from consideration in block 214. However, if the computer determines that the similarity value is above the similarity threshold, the computer system adds the file to a similarity class in block 216.

In some embodiments, the historical files in this similarity class may later be used when calculating an intensive extraction success value, such as in FIG. 1. For example, in some embodiments, a computer system may calculate a historical success metric for each historical file in the similarity class, or for the similarity class as a whole.

In some embodiments, adding the selected historical file to the similarity class in block 216 may also involve adding other similar historical files to the similarity class as well. For example, if the available historical files are separated into groups based on similarity, adding a file to the similarity class in block 216 may include adding all other historical files from that group as well.

After performing the subprocesses of either block 214 or block 216, the computer system performing method 200 determines, in block 218, whether there are any other historical files for which a similarity value may be calculated. This may include, for example, determining whether any historical files on a list of historical files have not either been discarded in block 214 or added to a similarity class in block 216. If the computer system determines that further historical files are available, the computer system returns to block 208 at which point a further historical file is selected for similarity comparison. However, if the computer system determines that no further historical files are available, the computer system ends method 200 by finalizing the similarity class in block 220.

As has been discussed previously, a machine-learning model may process and analyze input data (here, a combination of subject file features, historical file features, and historical extraction results) by recognizing patterns in the input data and comparing those patterns to patterns related to historical intensive extraction attempts on which the machine-learning model has been trained. For example, a neural network may recognize several patterns in the data expressed by an input vector for a particular subject file. The neural network may then associate some of those patterns with the patterns associated with historical files that the neural network has been trained (e.g., by human-supervised training or automatic training) to predict intensive extraction success.

In some embodiments, data input into a machine-learning model may take the form of a vector. A vector may be a one-dimension matrix (e.g., a matrix with one row and many columns) of numbers, each of which expresses data related to, for example, subject file features, historical file features, and historical extraction results. A vector may also be referred to herein as an "input vector," a "feature vector," or a "multi-dimension vector." This vector may include, for example, file names, file origins, file metadata, file formats, amount of text extracted in previous intensive extraction attempts, amount of resources required in previous extraction attempts, and others.

Figure 3:
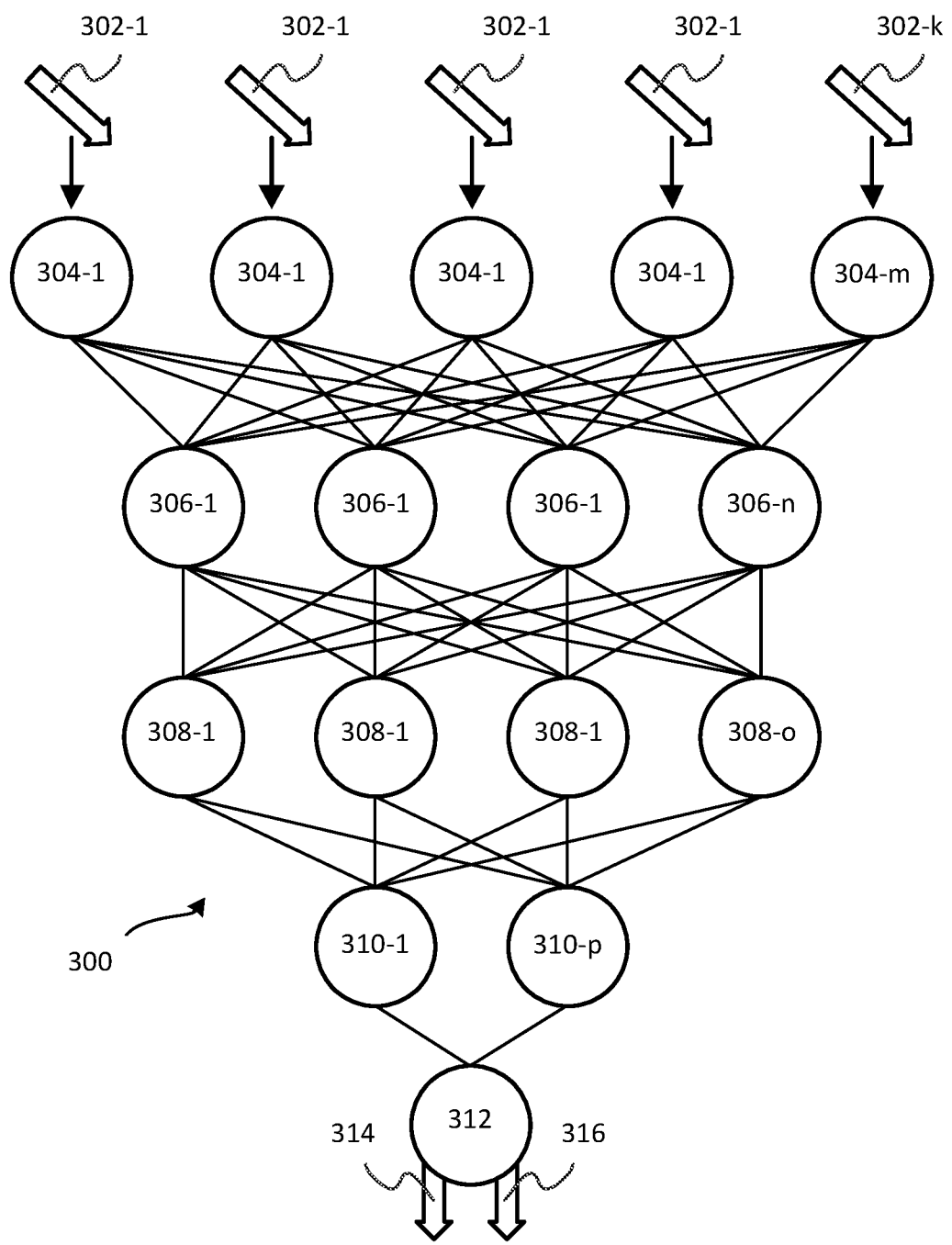
FIG. 3 illustrates the representative major components of a machine-learning model that may be used in accordance with embodiments of the present disclosure.

Such a machine-learning model is illustrated in FIG. 3. In FIG. 3, machine-learning model 300 may be trained to predict whether any text would be extracted from a subject file by intensive extraction methods (i.e., an extraction success value). The inputs of machine-learning model 300 are represented by feature vectors 302-1 through 302-$k$. These feature vectors may contain all information that is available after identifying features of a subject file, identifying features of historical files, and identifying information pertaining to historical extraction attempts on those historical files. In some embodiments, feature vectors 302-1 through 302-$k$ may be identical copies of each other. In some embodiments, more of instances of feature vectors 302 may be utilized. The number of feature vectors 302-1 through 302-$k$ may correspond to the number of neurons in feature layer 304. In other words, in some embodiments, the number of inputs 302-1 through 302-$k$ (i.e., the number represented by m) may equal (and thus be determined by) the number of first-layer neurons in the network. In other embodiments, machine-learning model 300 may incorporate 1 or more bias neurons in the first layer, in which case the number of inputs 302-1 through 302-$k$ may equal the number of first-layer neurons in the network minus the number of first-layer bias neurons.

Feature layer 304 contains neurons 301-1 through 301-$m$. Neurons 304-1 through 304-$m$ accept as inputs feature vectors 302-1 through 302-$k$ and process the information therein. Once vectors 302-1 through 302-$k$ are processed, neurons 304-1 through 304-$m$ provide the resulting values to the neurons in hidden layer 306. These neurons, 306-1 through 306-$n$, further process the information, and pass the resulting values to the neurons in hidden layer 308. Similarly, neurons 308-1 through 308-$o$ further process the information and pass it to neurons 310-1 through 310-$p$. Neurons 310-1 thorough 310-$p$ process the data and deliver it to the output layer of the machine-learning model, which, as illustrated, contains neuron 312. Neuron 312 may be trained to calculate two values—value 314 and value 316. Value 314 may represent the likelihood that a particular intensive extraction method (e.g., question-answer-pair identification) would actually extract text from a subject file. Value 316, on the other hand, may represent the likelihood that the extraction method would NOT extract text from the subject file.

In some embodiments, machine-learning model 300 may have more than 5 layers of neurons (as presented) or fewer than 5 layers. These 5 layers may each comprise the same amount of neurons as any other layer, more neurons than any other layer, fewer neurons than any other layer, or more neurons than some layers and fewer neurons than other layers. Finally, in some embodiments, the output of output layer 312 may be compared to a success threshold to determine whether intensive extraction should be performed on the subject file or skipped for the subject file.

Figure 4:
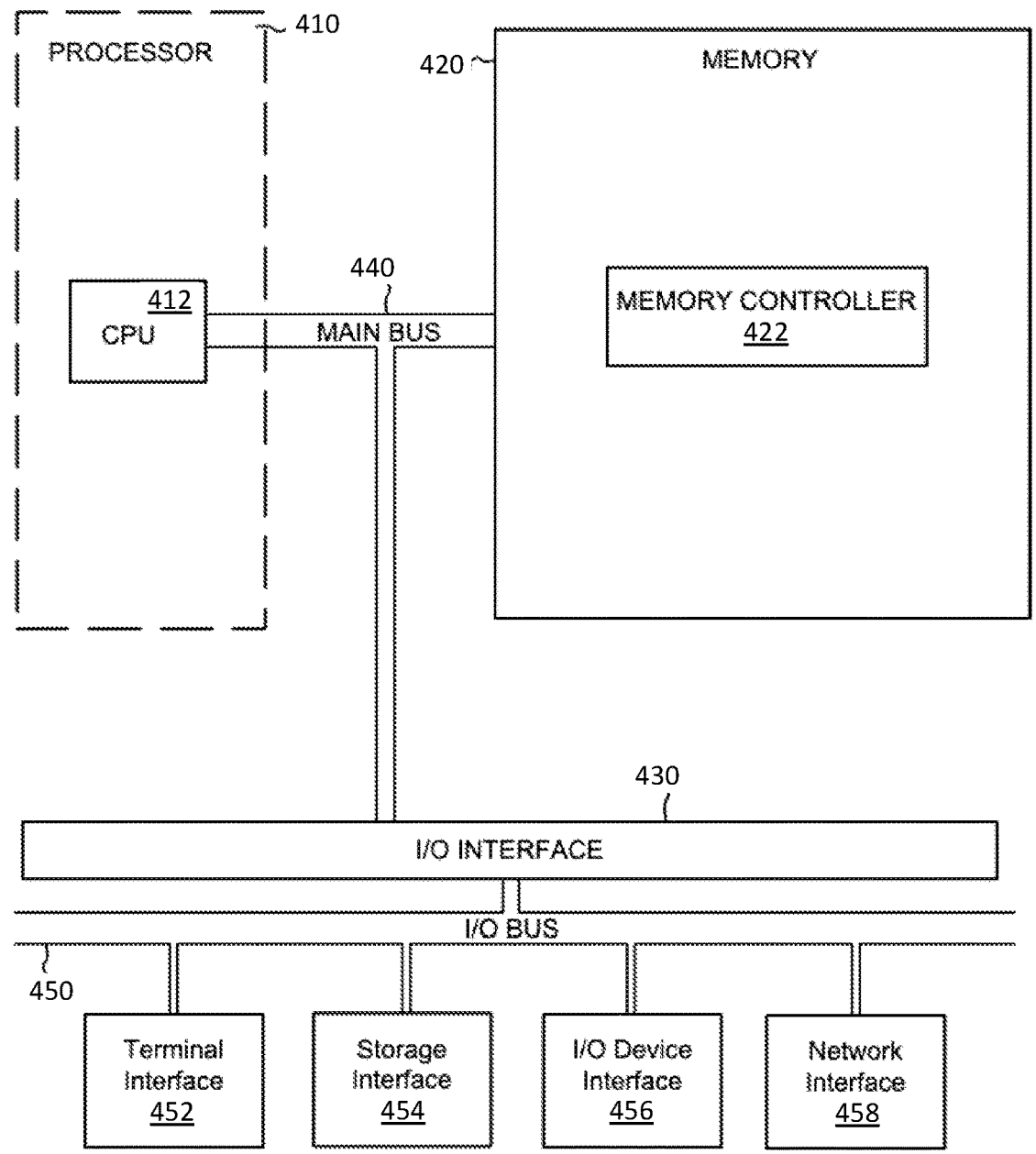
FIG. 4 illustrates the representative major components of a computer system that may be used in accordance with embodiments of the present disclosure.

FIG. 4 depicts the representative major components of an example Computer System 401 that may be used in accordance with embodiments of the present disclosure. For example, Computer System 401 may perform method 200 to create a similarity class of similar files or method 100 to determine whether to perform intensive extraction methods on a subject file. In some embodiments, Computer System 401 may utilize a machine-learning model, such as machine-learning model 300, when performing methods of the present disclosure.

The particular components depicted are presented for the purpose of example only and are not necessarily the only such variations. The Computer System 401 may include a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may include one or more CPUs 412. The Processor 410 may additionally include one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may include one or more circuits configured to perform one or more methods consistent with embodiments of the present disclosure. In some embodiments, the Computer System 401 may contain multiple Processors 410 typical of a relatively large system. In other embodiments, however, the Computer System 401 may contain a single processor with a singular CPU 412.

The Memory 420 of the Computer System 401 may include a Memory Controller 422 and one or more memory modules for temporarily or permanently storing data (not depicted). In some embodiments, the Memory 420 may include a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may include an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may include the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying a feature of a subject file;
   comparing the feature to a historical feature of a historical file;
   calculating, based on the comparing, a similarity between the subject file and the historical file;
   identifying a historical success metric for the historical file, wherein the historical success metric is an average historical success metric, and wherein the identifying comprises:
      identifying a first historical success metric for the historical file;
      identifying a second historical success metric for a second historical file; and
      calculating an average of the first historical success metric and the second historical success metric, resulting in the average historical success metric;
   calculating, based on the similarity and the historical success metric, an intensive text extraction success value for the subject file; and
   determining, based on the intensive extraction success value, that more than one intensive text extraction method should be performed on the subject file.

2. The method of claim 1, wherein the similarity is expressed as a similarity value and the method further comprises:
   determining that the similarity value is not bound by a similarity threshold; and
   adding the historical file to a similarity class in response to the determining that the similarity value is not bound by a similarity threshold.

3. The method of claim 1, wherein the intensive text extraction method includes optical character recognition.

4. The method of claim 1, further comprising determining a correlation between the historical feature and the historical success metric.

5. The method of claim 4, wherein the similarity is weighted by the correlation.

6. The method of claim 4, wherein the calculating the intensive text extraction success value is weighted by the correlation.

7. A system comprising:
   a processor; and
   a memory in communication with the processor, the memory containing program instructions that, when executed by the processor, are configured to cause the processor to perform a method, the method comprising:
      identifying a feature of a subject file;
      comparing the feature to a historical feature of a historical file;
      calculating, based on the comparing, a similarity between the subject file and the historical file;
      identifying a historical success metric for the historical file, wherein the historical success metric is an average historical success metric, and wherein the identifying comprises:
         identifying a first historical success metric for the historical file;
         identifying a second historical success metric for a second historical file; and
         calculating an average of the first historical success metric and the second historical success metric, resulting in the average historical success metric;
      calculating, based on the similarity and the historical success metric, an intensive text extraction success value for the subject file; and
      determining, based on the intensive extraction success value, that more than one intensive text extraction method should be performed on the subject file.

8. The system of claim 7, wherein the similarity is expressed as a similarity value and the method further comprises:
  determining that the similarity value is not bound by a similarity threshold; and
  adding the historical file to a similarity class in response to the determining that the similarity value is not bound by a similarity threshold.

9. The system of claim 7, wherein the intensive text extraction method includes identifying pairs of questions and answers.

10. The system of claim 7, wherein the method further comprises determining a correlation between the historical feature and the historical success metric.

11. The system of claim 10, wherein calculating the similarity is weighted by the correlation.

12. The system of claim 10, wherein the calculating the intensive text extraction success value is weighted by the correlation.

13. A computer program product, the computer program product comprising a computer readable storage medium having program instructions embodied therewith, the program instructions executable by a computer to cause the computer to:
  identify a feature of a subject file;
  compare the feature to a historical feature of a historical file;
  calculate, based on the comparing, a similarity between the subject file and the historical file;
  identify a historical success metric for the historical file, wherein the historical success metric is an average historical success metric, and wherein the identifying comprises:
    identifying a first historical success metric for the historical file;
    identifying a second historical success metric for a second historical file; and
    calculating an average of the first historical success metric and the second historical success metric, resulting in the average historical success metric;
  calculate, based on the similarity and the historical success metric, an intensive text extraction success value for the subject file; and
  determine, based on the intensive extraction success value, that more than one intensive text extraction method should be performed on the subject file.

14. The computer program product of claim 13, wherein the similarity is expressed as a similarity value and the program instructions further cause the computer to:
  determine that the similarity value is not bound by a similarity threshold; and
  add the historical file to a similarity class in response to the determining that the similarity value is not bound by a similarity threshold.

15. The computer program product of claim 13, wherein the program instructions further cause the computer to determine a correlation between the historical feature and the historical success metric.

16. The computer program product of claim 15, wherein calculating the similarity is weighted by the correlation.

17. The computer program product of claim 15, wherein calculating the intensive text extraction success value is weighted by the correlation.

18. The method of claim 1, wherein the feature is selected from the group consisting of a name of the subject file, a size of the subject file, data in HTML tags, dates related to the subject file, a creator of the subject file, an owner of the subject file, a format of the subject file, a server from which the subject file was received, directory information from the server, text extracted from the subject file, and a number of embedded images in the file.

19. The method of claim 1, wherein the identifying the feature comprises:
  identifying a set of features of the subject file;
  comparing the set of features to a list of features correlated with successful text extraction; and
  selecting at least one feature in the set of features that matches a feature from the list of features.

20. The system of claim 7, wherein the identifying the feature comprises:
  identifying a set of features of the subject file;
  comparing the set of features to a list of features correlated with successful text extraction; and
  selecting at least one feature in the set of features that matches a feature from the list of features.

* * * * *